July 29, 1924.
C. PAGE
CUTTING TOOL
Filed Dec. 27, 1921
1,502,743
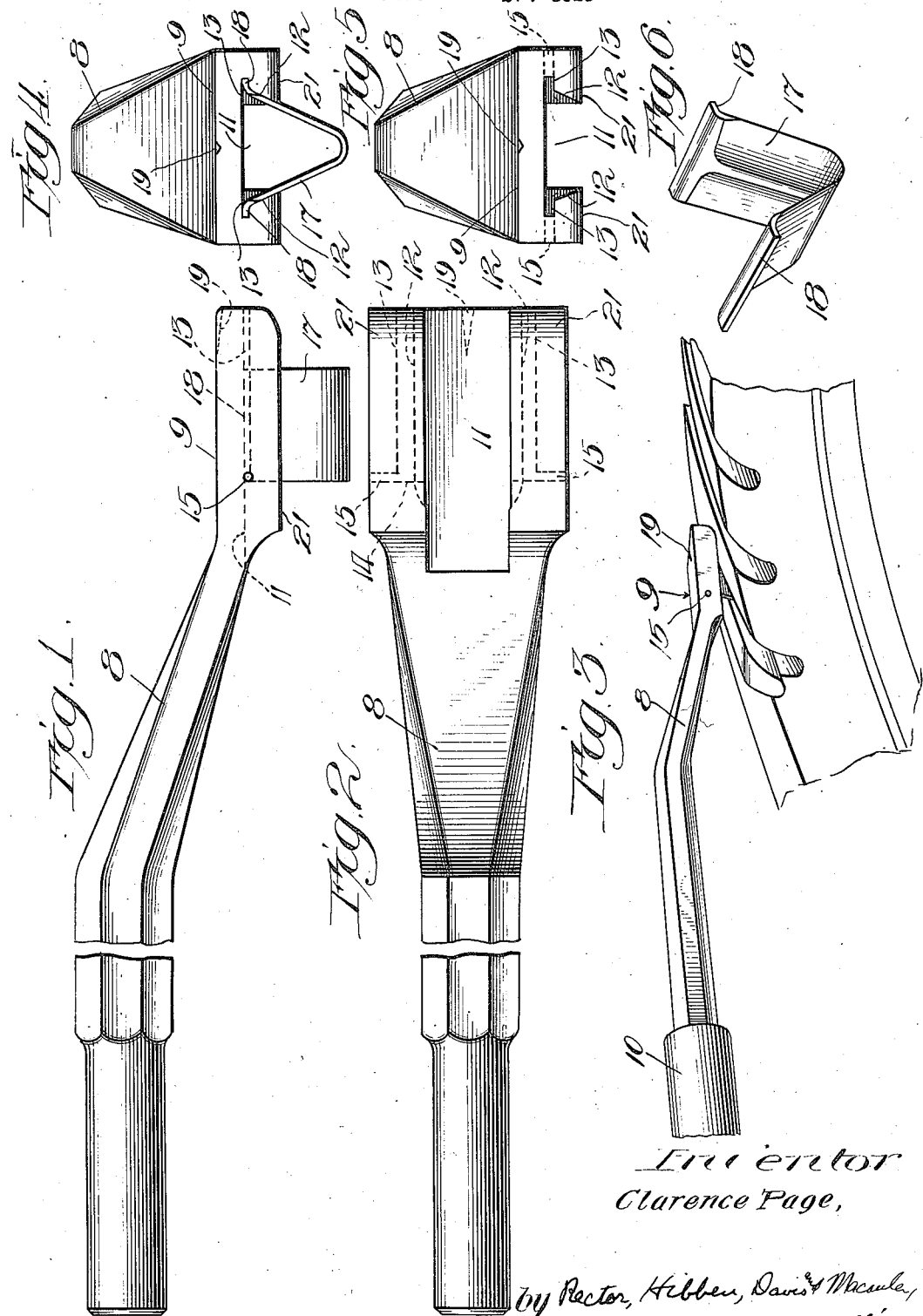
Inventor
Clarence Page,
by Rector, Hibben, Davis & Macauley
Attys Patented July 29, 1924.

1,502,743

UNITED STATES PATENT OFFICE.

CLARENCE PAGE, OF DETROIT, MICHIGAN, ASSIGNOR TO CHICAGO PNEUMATIC TOOL COMPANY, OF NEW YORK, N. Y., A CORPORATION OF NEW JERSEY.

CUTTING TOOL.

Application filed December 27, 1921. Serial No. 525,129.

*To all whom it may concern:*

Be it known that I, CLARENCE PAGE, a citizen of the United States, residing at Detroit, in the county of Wayne and State of Michigan, have invented certain new and useful Improvements in Cutting Tools, of which the following is a specification.

My invention relates to cutting tools, and more particularly to tools adapted for use in cutting designs in treads of vehicle tires, such, for instance, as re-treading or re-cutting designs in the treads of solid rubber tires, which have become worn. Prior to my invention, tools of this class have been constructed with the cutting blade or element integral with or inseparable from the holder and, as the cutting blade is often broken or rendered unfit for service when it encounters nails or other foreign substances, which may become imbedded in the tire, the life of the tool has been comparatively short, the holder being necessarily discarded or scrapped with the damaged cutting blade. The principal object of my invention is to provide a simple and efficient tool in which the cutting blade or element may be easily and quickly attached to and detached from the holder, thus permitting broken or dulled blades to be readily removed and replaced by a new or sharpened one.

Other important objects of my invention are accomplished by constructing and arranging the parts so that the cutting element is firmly retained in place due to its own resiliency, the shape of the cutting element is maintained by the cooperation of parts of the holder therewith, the rubber strip, cut away from the tire tread, passes between the holder and the cutting element without being interfered with by the handle of the holder or the hand of the operator, and an indentation or cut in the holder serves as a sight opening to aid the operator in guiding the tool during cutting operations.

With the above and incidental objects in view, the invention consists in certain novel features of construction and combinations of parts, the essential elements whereof are recited in the appended claims and the preferred form of embodiment of which is described in detail hereinafter and illustrated in full in the accompanying drawings, which form part of this specification.

Of said drawings, Fig. 1 is a side elevation of the tool, embodying my invention; Fig. 2 is a bottom plan view of the holder; Fig. 3 is a perspective view of the tool, shown attached to a pneumatic hammer and as being used for recutting a design in the tread of a solid rubber tire; Fig. 4 is a front end elevation of the tool; Fig. 5 is a similar view with the cutting element removed, and Fig. 6 is a perspective view of the cutting element or blade.

Referring to the drawings, the holder comprises a shank or handle 8 and an enlarged forward end or head 9. In Fig. 3 the rounded end of the shank is shown mounted in a pneumatic tool 10, such as a pneumatic hammer. The head 9 of the holder is rectangular in contour and its bottom face is provided with a channel 11 having inclined sides 12, the upper portions of which are slightly curved and merge with the lower sides of grooves 13 opening into the channel 11. It will be observed that the channel 11 extends throughout the longitudinal center of the lower face of the head 9 and that the grooves 13 are of lesser extent longitudinally, as they terminate at 14. In order to insure that the ends 14 of the grooves 13 are smooth and in perfect alignment, holes 15 are drilled at right angles to the grooves 13.

The cutting element or blade 17 is formed from a blank sheet of metal of uniform thickness, bent to the required shape in order that it may cut grooves of the preferred design in the tread of the tire. For illustrative purposes I have shown the cutting element 17 as being V-shaped, with both ends sharpened to form the cutting edges and the side marginal portions 18 curved outwardly.

From the above description the construction and operation of the tool, embodying my invention, will be obvious. The cutting blade or element 17 being of a resilient or spring character, upon being placed in the holder, holds the flanges 18 firmly in the grooves 13 and presses the portions under and adjacent the flanges against the inclined sides 12 of the channel 11, the tool being held firmly in position in this manner. The rear ends of the flanged portions 18 contact with the ends 14 of the grooves 13. In using the tool, the surfaces 21 on the lower face of the head 9 and on either side of the cutting element rest upon the tread of the tire, as indicated in Fig. 3, and the pneumatic hammer is operated to advance the tool. As the tool advances, a strip of rubber is cut from the tread to make the design and the strip passes between the lower face of the head and the cutting edge, the shank 8 being inclined upwardly from the head 9 so that the shank or the hand of the operator thereon will not interfere with the strip of cut rubber. The forward edges of the flanges 21 are curved to permit the holder to be tilted and held at the required angle with respect to the tread, so that the strip of rubber to be cut from the tread is of the desired depth and accurately gauged. The forward end of the upper face of the head 9 is provided with a V-shaped recess or indentation 19 at its center and this serves as a sight-opening to aid the operator in advancing the tool over the required path. When the edge on one end of the cutting element becomes dull, the element may be turned around in the holder so that the other sharpened end may be used as the cutting edge.

While I have shown the cutting edge or element as being V-shaped, it is apparent that this element may be of any other desired shape dependent upon the design to be cut in the tread of the tire. It is also obvious that, while I have described the invention as being peculiarly adapted for re-cutting the design in the tread of solid tires, the invention is adapted for use in cutting treads of other tires and also for cutting articles of other classes made of rubber, leather, wood or similar materials. Although I have described but one form of embodiment of my invention, it is to be understood that the invention is susceptible of various changes and modifications, all coming within the scope and spirit of my invention and defined in the following claims.

I claim:

1. In a device of the class described, the combination of a holder, having grooves, and a cutting element having edges retained in said grooves by the resiliency of the cutting element and its intermediate portion suspended out of contact with the holder.

2. In a device of the class described, the combination of a holder having grooves, and a channel-shaped cutting element having a cutting edge on one end, and flanges on its sides engaging into said grooves.

3. In a device of the class described, the combination of a holder having grooves, and a reversible channel-shaped cutting element having cutting edges on both ends and flanges on its sides engaging into said grooves.

4. In a device of the class described, the combination of a holder having a channel extending longitudinally thereof and grooves opening into said channel, and a cutting element having its side marginal portions bent outwardly to fit into said grooves and retained therein by the resiliency of the element.

5. In a device of the class described, the combination of a holder having a channel in its lower face and grooves opening into said channel, and a channel-shaped cutting element open at both ends and having a cutting edge on one end and side marginal flanges fitting in said grooves.

6. In a device of the class described, the combination of a holder having grooves, and a channel-shaped cutting element of uniform thickness, having one end sharpened to form a cutting edge, and adapted to be sprung into place in the holder with its side marginal portions positioned in the grooves.

7. In a device of the class described, the combination of a holder having a channel in one face and grooves opening into the channel, the portions on either side of the channel being adapted to rest on the article to be cut, and a channel-shaped cutting element having flanges positioned in said grooves.

8. In a device of the class described, the combination of a holder having a channel with inclined sides in one face and grooves merging into the channel, and a V-shaped cutting element adapted to be sprung into place in the holder so that its side marginal portions engage in the grooves and the adjacent portions engage the inclined sides of the channel.

9. In a device of the class described, the combination of a holder having a channel in one face and grooves opening into said channel, and a channel-shaped cutting element sprung into place with its side marginal portions engaging in said grooves and having one end forming the cutting edge and the other end of the marginal portions engaging the ends of the grooves.

10. In a device of the class described, the combination of a holder having a channel in one face and open at both ends and grooves opening into said channel and having one end opened and the other closed, a channel-shaped cutting element having both ends open and a cutting edge on one end with the side marginal portions engaging in said grooves.

11. In a device of the class described, the combination of a holder comprising a holding part and a handle curving upwardly therefrom, the holding part being provided with grooves and a channel-shaped cutting element on the lower side of the holding part open at both ends, provided with a cutting edge on one end, and having its side marginal portions positioned in said grooves.

12. In a device of the class described, the combination of a holder comprising a handle and an enlarged end provided with grooves, and a cutting element bent to form marginal flanges engaging in said grooves and open at both ends so that the material cut away may pass between the lower face of the enlarged end of the holder and the cutting element, the upper face of such end being provided with a sight indentation in its forward end.

13. In a device of the class described, the combination of a handle, a head and a channel-shaped cutting element having a cutting edge on the forward end and open at both ends to permit the material cut to pass through the same toward the handle and under the head and means on the head projecting on either side and in front of the cutting edge to govern the depth of the cut.

14. In a device of the class described, the combination of a holder having a channel in one face, forming flanges, and grooves opening in to said channel, and a channel-shaped cutting element open at both ends and having a cutting edge at one end and side marginal flanges fitting into said grooves, the lower faces of the flanges on the holder being adapted to rest on the article cut during a cutting operation.

15. In a device of the class described the combination of a holder having a recess therein and a cutting element of resilient material having a portion extending within said recess and retained therein by the resiliency of the element, said element having a channelled portion provided with a cutting edge extending beyond said holder.

16. In a device of the class described the combination of a holder having a recess therein, a channel-shaped cutting element arranged to fit within said recess and to dispose a cutting edge beyond said holder, said element having angular disposed portions, and means on said holder engaging said portions of said element for retaining the same operatively associated with said holder.

17. In a device of the class described the combination of a channel-shaped cutting element having outwardly bent side marginal portions and a cutting edge at one end, and a holder therefor having means engaging said marginal portions and arranged to dispose at least a portion of said cutting edge beyond said holder.

18. A holder for channel-shaped cutting elements having parts angularly disposed relative to their cutting edges, having a handle at one end and opposed grooves formed in the other end for removably supporting a cutting element in a manner to dispose at least a portion of the cutting edge beyond the holder, the holder providing in the latter end a fixed abutment for defining the position of a cutting element thereon.

19. A holder for cutting elements of the class described having a handle at one end and a head at the other end, said head having fixed portions forming a longitudinally disposed undercut channel to receive the cutting element and formed with an abutment for limiting the movement of the cutting element within said channel.

20. A holder for cutting elements of the class described having a handle at one end and a head at the other end, said head having fixed portions forming a longitudinally disposed channel and having longitudinally extending lateral recesses merging into said channel, said head providing an abutment for limiting the movement of the cutting elements within said channel.

21. A holder for cutting elements of the class described comprising a handle in the form of a shank adapted for use in a percussive tool and having means for removably supporting a channel-shaped cutting element in a manner to dispose at least a portion of the cutting edge thereof beyond the holder.

22. A holder for cutting elements of the class described comprising a handle in the form of a shank adapted for use in a percussive tool and having means adapted to cooperate with the side marginal portions of a channel-shaped cutting element to removably support the same in a manner to dispose at least a portion of the cutting edge thereof beyond the holder whereby the holder serves as a gauge for the depth of the cut made by the cutting element.

23. A cutting element adapted for use in combination with a holder for re-grooving vehicle tires and the like comprising a channel-shaped member of resilient material having a cutting edge at one end and adapted to have its free side edges received in a suitable recess in the holder and to be retained therein by the resiliency of the cutting element itself.

24. A reversible cutting element for use in combination with a holder for re-grooving vehicle tires and the like comprising a channel shaped member having sharpened edges at each end and outwardly bent side marginal portions for securing the element to the holder.

25. A cutting element for use in combination with a holder for re-grooving vehicle tires and the like comprising a channel-shaped member having a cutting edge at one end and parts angularly disposed relative to said edge whereby the member is retained in the holder.

CLARENCE PAGE.